March 4, 1941.  E. E. ROBINS  2,233,798
BRAKE CONTROLLING MEANS FOR HOISTS
Filed July 22, 1939  3 Sheets-Sheet 1
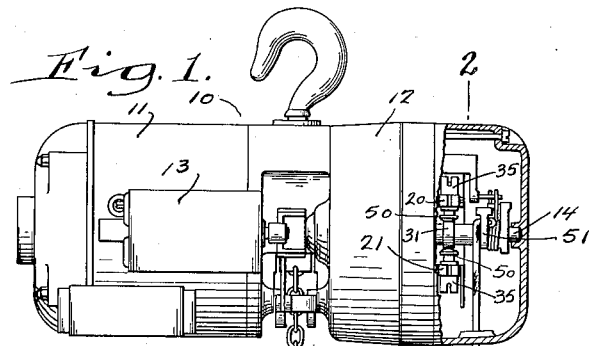
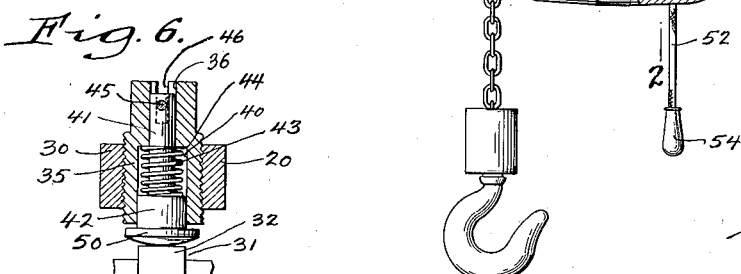
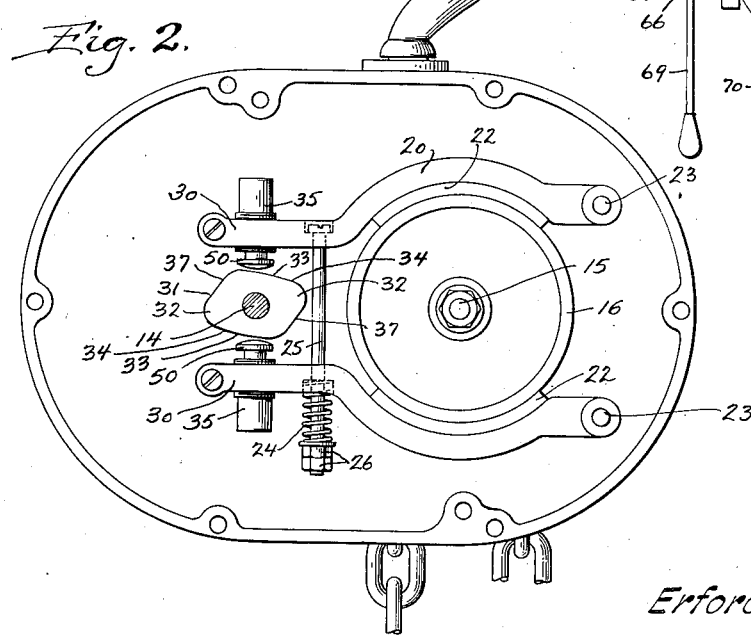
Inventor
Erford E. Robins
by J. W. Ellis
Attorney.

March 4, 1941.  E. E. ROBINS  2,233,798
BRAKE CONTROLLING MEANS FOR HOISTS
Filed July 22, 1939  3 Sheets-Sheet 2
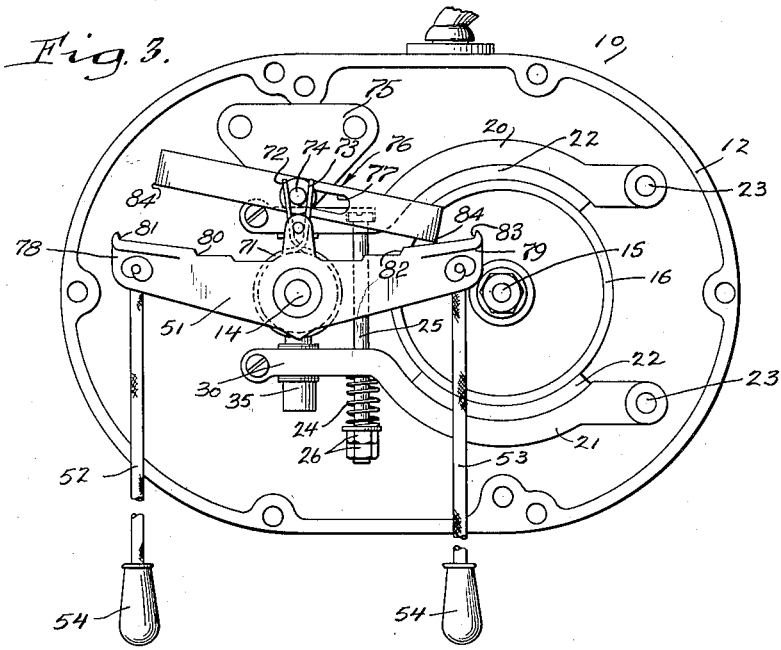
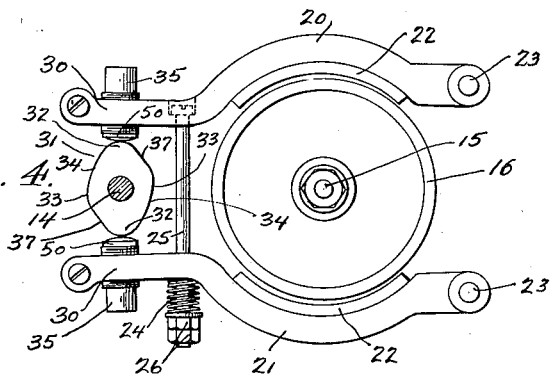
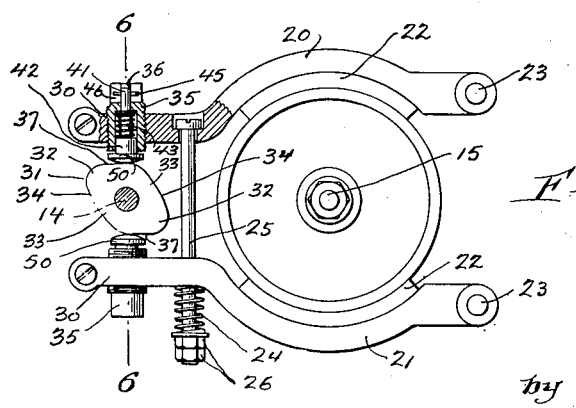
Inventor,
Erford E. Robins
JW M Ellis
Attorney.

March 4, 1941.       E. E. ROBINS       2,233,798
BRAKE CONTROLLING MEANS FOR HOISTS
Filed July 22, 1939       3 Sheets-Sheet 3
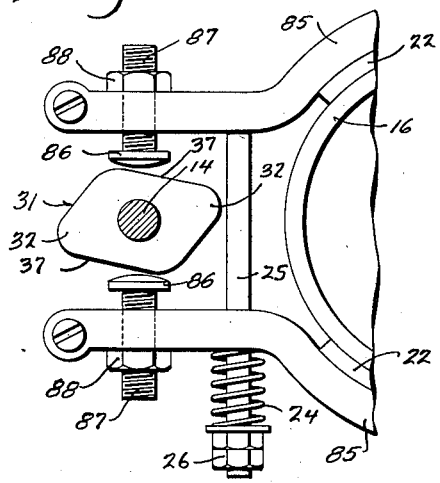
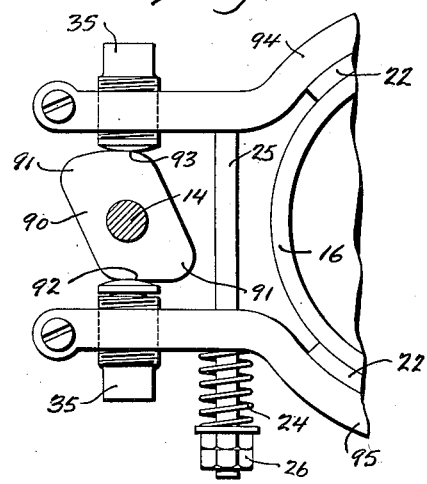
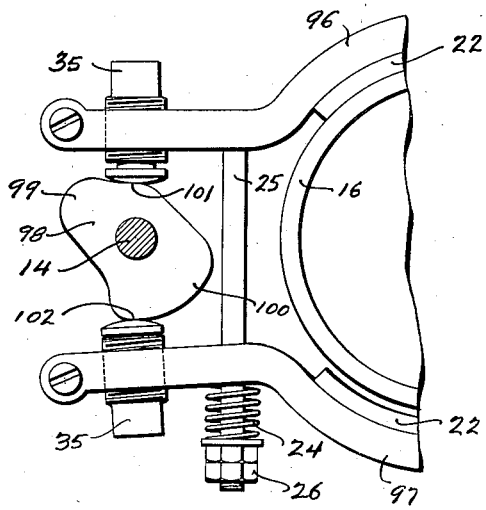
INVENTOR
ERFORD E. ROBINS
BY J. W. Ellis
ATTORNEY Patented Mar. 4, 1941

2,233,798

UNITED STATES PATENT OFFICE 2,233,798

BRAKE CONTROLLING MEANS FOR HOISTS

Erford E. Robins, Tonawanda, N. Y., assignor to Columbus McKinnon Chain Corporation, Tonawanda, N. Y., a corporation of New York Application July 22, 1939, Serial No. 286,014

16 Claims. (Cl. 192—2)

This invention relates in general to a hoist and has for its primary object to provide a hoist which is efficient in operation and one in which the movements up and down, as well as the arrest of the load, are more readily put under the control of the operator. More specifically, my invention has to do with hoist brakes and means for controlling the same.

It is well known to those skilled in the art that in all types of hoists, no matter by what means they are operated, suitable brake means must be employed to sustain the load when elevated. In the hand-operated type of hoist, this is usually accomplished by the use of a brake of the so-called Weston type, or by suitable ratchet means. In the motor-operated type of hoist, two brakes are usually provided consisting of a motor brake mounted upon the motor shaft to stop the rotative momentum thereof, thereby preventing the hoist from drifting, and a load brake either of the Weston type or of the magnetic type. When lowering a hand hoist provided with either Weston type or ratchet brake, the hand-operated means is actuated in the desired direction and the load is lowered by a somewhat step-by-step movement. In the motor-operated hoist, the magnetic load brake is released and the Weston type brake is made inactive on the upward movement, but on the downward movement the load brake is usually kept applied while the motor brake is released with the result that the motor must be operated to overcome the full braking resistance of this brake. Attempts have been heretofore made to construct a motor-driven hoist with but one brake to be fully released on the upward movement as well as on the downward movement of the load with the result that the load on its downward movement overhauls the motor, thus allowing such load to descend in substantially uncontrolled manner until it is stopped in jerky manner by the full application of the brake or by coming to rest suddenly upon a fixed surface. Such uncontrolled operation of the hoist makes it difficult as well as dangerous to handle the load and spotting thereof is somewhat uncertain.

The principal object of my invention has been to provide a hoist having but one brake fully releasable upon the up movement thereof but partially loaded during the down movement thereof.

Another object has been to provide brake operating means for hoists so designed that sufficient pressure will remain applied to the brake during the lowering movement of the load so that it will be necessary to apply some power to positively operate the hoist during such lowering movement, whereby the load is under control at all times and spotting thereof is made a relatively simple matter.

It has been a still further object to provide spring-pressed means at the end of each of the brake arms of a hoist for partially counteracting or unloading the tension of the brake applying means.

A further object has been to provide a cam for hoist controls which is so formed that when operated in one direction the brake of the hoist will be fully released, as during the load-elevating movement, but only partially released when operated in the opposite direction, as during the load-lowering movement thereof.

The above objects and advantages have been accomplished by the device shown in the accompanying drawings, of which:

Fig. 1 is a side elevation of a complete hoist embodying my invention.

Fig. 2 is an enlarged, sectional, end elevation of my hoist, taken on line 2—2 of Fig. 1.

Fig. 3 is an end elevation of the hoist with the control cover thereof removed.

Figs. 4 and 5 show the two extreme positions of operation of the brake cam of my hoist and its associated parts.

Fig. 6 is an enlarged, sectional elevation showing the cam with one of the spring-pressed unloading means in section, taken on line 6—6 of Fig. 5.

Fig. 7 is a somewhat diagrammatic view of a hand-operated hoist embodying my invention.

Figs. 8, 9 and 10 are fragmentary views of modified forms of device.

While my invention is applicable to hoists actuated by any type of motive power, for the purpose of illustrating the invention I have shown and described it as applied to an electric hoist, it being understood that the invention is not to be limited to this specific use.

In Figs. 1–6 inclusive of the drawings, 10 represents an electrically-operated hoist, having an electric motor 11. The casing which contains the reduction gears (not shown) of the hoist is represented at 12. The motor control switch is shown at 13 and this is suitably connected to the control shaft 14 of the hoist.

This hoist is provided with but one brake mounted upon the motor shaft 15 and including a brake drum 16 and two oppositely arranged brake arms 20 and 21. The brake arms are arranged on opposite sides and in cooperative relation with the brake drum 16 and each arm is provided with a lining 22. Each of these arms is pivotally carried by a brake arm pin 23, suitably supported by some part of the hoist. As is customary in this type of construction, the two brake arms 20 and 21 are urged toward each other by means of a brake spring 24, which is mounted upon the outer end of a brake screw or bolt 25 connecting the two brake arms. Adjusting nuts 26 are screwthreaded to the extreme outer end of the bolt, whereby the tension of the spring 24 may be adjusted.

Mounted between the outer ends 30 of the brake arms 20 and 21 is the brake cam 31 of my device. This cam is suitably mounted upon the control shaft 14 so as to rotate with the control shaft. As shown in Figs. 2, 4 and 5, this cam has an unsymmetrical periphery. As shown in Fig. 4, the periphery of the cam is formed with a full release lobe 32 at opposite sides and near each end thereof, and an adjacent, non-active cam surface 33 is provided at each side thereof and oppositely arranged with respect to each other, said surfaces 33 being connected to said lobes by surfaces 34. The cam is also formed on its periphery with oppositely arranged, partial-release surfaces 37 which are curved, like the lobes 32. These surfaces coact with the brake arms 20 and 21 to partially release the brake pressure when the load is being lowered, as hereinafter more fully described.

Carried by each of the ends 30 of the brake arms 20 and 21 is a brake release sleeve 35 which is screwthreaded into the end of the arm. Each sleeve is provided with a centrally arranged aperture 36 and a counterbore 40 near the inner end thereof. A plunger 41 is mounted within the aperture 36 and is provided with an enlarged shoulder 42 for engagement with the counterbore 40 of the sleeve. A helical spring 43 is mounted about the plunger 41 and within the counterbore 40, having one of its ends bearing against the shoulder 44 provided between the bore 36 and the counterbore 40, and the other end bearing against the outer face of the shoulder 42, whereby the plunger will be urged outwardly under the tension of the spring 43. A pin 45 is carried by the plunger 41 and is disposed within a slot 46 formed in the outer end of the sleeve 35, whereby the inward movement of the plunger 36 is limited. Each of the plungers carries a button 50 at its outer end which is arranged adjacent to the shoulder 42 and which is engageable with the inner end of the sleeve 35 when the plunger is forced inwardly the entire limit of its movement.

The springs 43 carried by the sleeves 35 are so proportioned in relation to the brake arm spring 24 that when they are pushed inwardly by the engagement therewith of the surfaces 37 of the cam only a limited amount of movement will be imparted to the plungers, which amount creates sufficient pressure to only partly counteract the spring 24 and thus partially release the brake, as shown in Fig. 5. When, however, the cam is operated in the opposite direction, as when elevating the load, the lobes 32 will be brought into contact with the buttons 50 of the plungers and operate them to the limit of their movement within the sleeves 35 or the place where the heads of the buttons will be engaged with the inner end of the sleeves, thereafter serving to positively force the outer ends 30 of the brake arms outwardly away from each other and thereby completely release the brake.

Carried by the control shaft 14 is the control lever 51 which may be of the conventional type but preferably is of the type shown and described in co-pending application Serial No. 247,375 upon Hoists, invented by Karl W. Stinson, which is designed to prevent too rapid operation of the control switch 13 when reversing the direction of rotation of the motor. Control cords 52 and 53, each having an operating handle 54 are of course provided as is customary. As shown in the drawings, the operating cord 52 is for elevating the load and the cord 53 is for lowering the same.

The lever 51 is kept normally in its neutral position by a centralizing spring 71 which is disposed upon the hub of the lever and is provided with upwardly extending and oppositely urged arms 72 and 73, one disposed upon each side of a pivot pin 74 carried by a bracket 75. A lock bar 76 is arranged above the control lever and is provided with a centrally arranged slot 77 which is slidably disposed upon the pivot pin 74. The lever 51 is provided with two arms 78 and 79 formed in their upper surfaces with abutment surfaces 80 and 81, and 82 and 83, respectively, with which the lower corner edges 84 of the lock bar are engageable under certain conditions of operation. When, for instance, the cord 53 is pulled, the corner edge 84 at the adjacent end of the lock bar 76 will drop down in front of the abutment 82. If the lever is now moved to its reversing position slowly enough, the said corner edge of the bar will engage the abutment 82 and the bar will thereby be pushed longitudinally on the pin 74 past the center of gravity, allowing its opposite end to fall and contact with the opposite end 78 of the lever where it will be engageable with either of the abutments 80 or 81 of the lever. However, if the lever is operated faster than that predetermined by the type of motor employed on the hoist, the end of the slot 77 of the bar will be brought into engagement with the pin 74 before it has had time to tilt upon said pin, thereby locking the lever and preventing immediate reverse movement thereof. If it is now desired to operate the hoist in the same direction, the pulling of the same cord 53 will cause the abutment 81 at the opposite end of the lever to engage the contacting edge 84 at that end of the bar and push it along the pin 74 whereupon the right hand end of the bar will be moved to the position shown in Fig. 3 where it will again be brought into action when the cord 53 is again operated. Obviously, when the cord 52 is pulled, the operation of the parts is identical with that just described except that the abutments 80 and 83 will be engaged by the bar. Since this control mechanism forms no part of my invention, it will not be further described.

In Fig. 7 I have shown, somewhat in diagrammatic manner, a hand-operated hoist embodying my invention. In this figure 55 represents the usual load-lifting chain and 56 the hand chain which passes over the hand chain wheel 57. A single brake 58 is employed comprising a drum 59 mounted on the hand wheel shaft 60 with which two oppositely arranged brake arms 61 and 62 are engageable. The cam 63 is mounted upon a control shaft 64 and, like the cam 31 of the electric hoist, is provided with full release lobes 65, inactive surfaces 66 and partial-release surfaces 67. An operating lever 68 is mounted upon the control shaft and it is provided with pull cords 69 and 70 for operating the cam in either direction depending upon the up or down movement of the hoist.

In view of the foregoing description, it will be obvious that when the load is to be elevated by my hoist, the brake upon the motor shaft will be completely released by the cam 31, as clearly shown in Fig. 4. However, when the load is being lowered, the brake will only be partially released by movement of the cam to the position shown in Fig. 5, which will prevent the load from overhauling the motor and thus provide a positive drive for the hoist on the lowering movement, thereby having the load under control at all times and making it possible to safely handle the load and easily spot the same.

If desired, the cam parts and cooperating surfaces of the brake arms may be so accurately proportioned and fitted that the spring-pressed buttons may be omitted, as shown in Fig. 8. In this form, each of the brake arms 85 is provided with an adjustable brake release button 86. Each of these buttons is mounted upon a screw-threaded stem 87 which is screwthreaded into the arm 85 and locked in its adjusted position by means of a locknut 88. In this form the cam 31 is substantially of the same contour as that of the form of invention shown in Figs. 1 to 7, inclusive. Furthermore, instead of having both cam arms operated in unison on the load-lowering movement of the hoist, the cam may be designed, as shown in Fig. 9, so as to impart an unequal amount of movement to the brake arms. In this form of the invention, the cam 90, which is mounted upon the control shaft 14, is provided with full release lobes 91 and with partial-release surfaces 92 and 93. The brake arms 94 and 95 are each provided with brake release sleeves 35 of the form of invention shown in Figs. 1 to 7, inclusive. The cam surface 93 is so shaped and positioned that the distance between this surface and the axis of the control shaft is slightly greater than the distance between the surface 92 and the said axis, so that the amount of pressure upon the brake linings of the arms 94 and 95 will be unequal, the pressure on the lining of arm 94 being released a greater amount than that exerted by the arm 95. Moreover, the cam may be so designed that only one arm may be operated, leaving the other arm in full brake-engaging position where it will provide the necessary restraint during the load-lowering movement, as shown by the modified form of Fig. 10. In this figure the brake arms 96 and 97 each carry a brake release sleeve 35 between which the cam 98 is mounted. This cam is provided with full release lobes 99 and 100 and with only one release surface 102. The surface 102 of the cam opposite the surface 101 is so designed as to fully release the brake lining of arm 97 and this surface may be substantially concentric with the full release lobe 100, whereby the brake lining of the arm 97 will be moved out of contact with the brake drum 16 when the cam 98 is moved to hoist-lowering position.

Obviously, these and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A hoist comprising a single brake, including a brake drum, and brake arms normally pressed in frictional contact with said drum, a cam located between said brake arms and in cooperation therewith, said cam having full-release lobes and partial-release surfaces, and means for operating said cam.

2. A hoist comprising a single brake, including a brake drum, and brake arms normally pressed in frictional contact with said drum, spring-pressed buttons carried by said arms, a cam located between said brake arms and in cooperation with said buttons, and means for operating said cam.

3. In a hoist, the combination, with the brake thereof, of a brake cam, said cam cooperating with said brake and being so designed that said brake may be fully released during the load-lifting movement of the hoist and only partially released during the load-lowering movement thereof, and means for operating said cam.

4. In a hoist, the combination, with the brake thereof, of a brake cam, said cam being so designed that said brake may be fully released during the load-lifting movement of the hoist and only partially released during the load-lowering movement thereof, spring-pressed means carried by the brake and cooperating with said cam during said load-lowering movement, and means for operating said cam.

5. In a hoist, the combination with the brake drum and the control shaft thereof, of brake control means, comprising brake arms arranged on opposite sides of and in cooperation with said drum, a brake cam mounted upon said control shaft and located between and in cooperative relation with said arms, said cam having full-release lobes engageable with said arms during the load-lifting movement of the hoist and partial-release surfaces engageable with said arms during the load-lowering movement of the hoist, and means carried by said control shaft for operating the same.

6. In a hoist, the combination with the brake drum and the control shaft thereof, of brake control means, comprising brake arms arranged on opposite sides of and in normal frictional cooperation with said drum, a spring-pressed button carried by each of said arms, a brake cam mounted upon said control shaft and in cooperative relation with said spring-pressed buttons, and means for operating said cam.

7. In a hoist, the combination with the brake drum and the control shaft thereof, of brake control means, comprising brake arms arranged on opposite sides of and in normal frictional cooperation with said drum, a spring-pressed button carried by each of said arms, a brake cam mounted upon said control shaft and in cooperative relation with said spring-pressed buttons, said cam having full-release lobes engageable with said buttons on the load-lifting movement of the hoist for operating said spring-pressed buttons to the limit of their movement, and partial-release surfaces engageable with said buttons on the load-lowering movement of said hoist for operating said spring-pressed buttons through only a portion of their movement, and means carried by the control shaft for operating the same.

8. In a hoist, brake control means, comprising a brake drum, brake arms in normal frictional engagement with said drum, a brake cam mounted between and in cooperative relation with said arms, said cam having full-release lobes engageable with said arms during the load-lifting movement of the hoist and partial-release surfaces engageable with said arms during the load-lowering movement of the hoist, and means for operating said cam.

9. In a hoist, brake control means, comprising a brake drum, brake arms cooperating with said drum, spring means for urging said arms toward each other and normally causing said brake to be applied, a spring-pressed button carried by each arm, a cam mounted between and in cooperative relation with the spring-pressed buttons, said cam having full-release lobes engageable with said buttons during the load-lifting movement of the hoist for operating said spring-pressed buttons to the limit of their movement, and partial-release surfaces engageable with said buttons during the load-lowering movements of the hoist for operating the same spring-pressed buttons through only a portion of their movement, and means for operating said cam.

10. In a brake for hoists, a brake drum, brake arms arranged on each side of said drum, means for pressing the arms against the drum to sustain the load, a brake cam mounted between and in cooperative relation with said arms, said cam having full-release lobes engageable with said arms during the load-lifting movement of the hoist and partial-release surfaces engageable with said arms during the load-lowering movement of the hoist, and means for operating said cam.

11. In a brake for hoists, a brake drum, brake arms arranged on each side of said drum, a brake spring for forcing said arms in contact with said drum, spring means carried by said arms for counteracting said brake spring, a brake cam cooperating with said spring means, said cam having engaging surfaces so designed that said spring means will partially counteract said brake spring during the load-lowering movement of the hoist and completely counteract said brake spring during the load-raising movement of said hoist, and means for operating said cam.

12. In a brake for hoists, a brake drum, brake arms arranged on each side of said drum, a brake spring for forcing said arms in contact with said drum, a brake release sleeve adjustably carried by each of said arms, a spring-pressed button slidably carried by each sleeve, a brake cam cooperating with said buttons, said cam having engaging surfaces so designed that said spring means will partially counteract said brake spring upon the load-lowering movement of the hoist and completely counteract said brake spring upon the load-raising movement of the hoist, and means for operating said cam.

13. In an electric hoist, a drive shaft, an electric motor for driving said shaft, control means for said motor, a normally engaged brake coacting with the drive shaft, a cam for the brake, said cam having full-release lobes and partial-release surfaces, and means interrelating said motor control means and said cam, whereby said brake is fully released on its up movement and only partially released on its down movement.

14. A cam for hoists having a single brake, said cam having oppositely arranged, full-release lobes, intermediate, non-active surfaces, and oppositely arranged, partial-release surfaces, whereby the brake of the hoist will be fully released during the load-lifting movement thereof and only partially released during the load-lowering movement thereof.

15. In a brake for hoists, a brake drum, brake arms arranged on each side of said drum, a brake spring for forcing said arms in contact with said drum, a brake release sleeve adjustably carried by each of said arms, a spring-pressed button slidably carried by each sleeve, a brake cam cooperating with said buttons, and means for operating said cam.

16. In a motor driven hoist having a predetermined lifting capacity, a brake drum, brake arms arranged to contact therewith, resilient means normally urging said brake arms onto said drum with sufficient pressure to stop the movement of said hoist and maintain it stationary when said hoist is loaded up to its aforesaid capacity, a cam cooperating with said brake and having non-active surfaces for normally permitting said resilient means to exert maximum braking pressure, full release surfaces for actuating said arms to fully release said brake to permit unrestrained elevation of the load by said hoist, and partial release surfaces for actuating said arms to a position where the weight of the load is partially absorbed by the brake, whereby the load is actuated by the motor of the hoist in the lowering thereof, and substantially rigid connecting means for positively operating said cam to either position of operation.

ERFORD E. ROBINS.